Aug. 3, 1926.

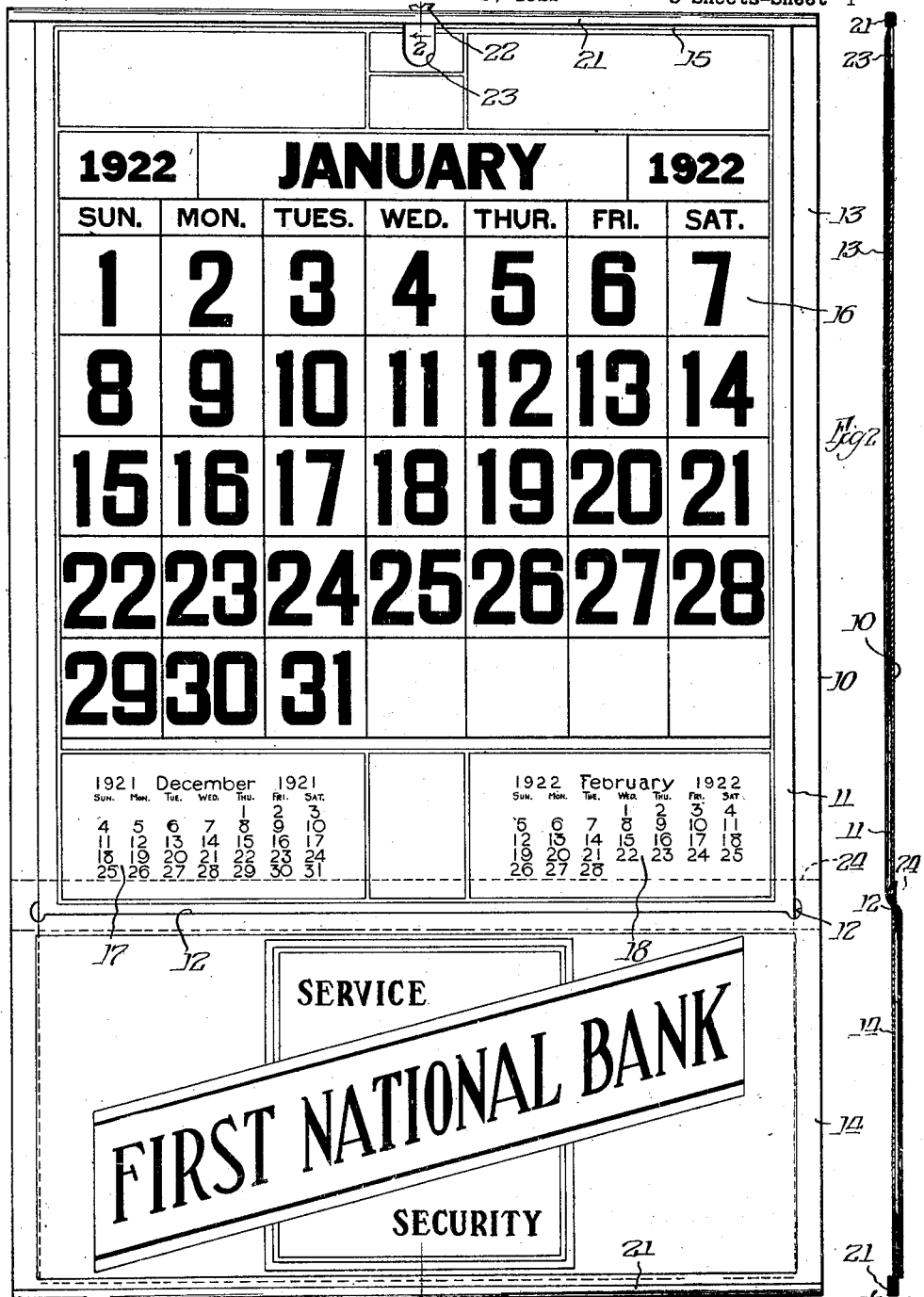

G. H. DEATON 1,594,499

RECORD CALENDAR

Filed Oct. 2, 1922

| 17 | | | | | | | 18 | |
|---|---|---|---|---|---|---|---|---|
| 25 26 27 28 29 30 31 | | | | | | 26 27 28 | | |

MEMORANDUM CALENDAR FOR JANUARY.

JANUARY

| SUN. | MON. | TUE. | WED. | THUR. | FRI. | SAT. |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | | | | |

JANUARY 1ST. MONTH.

*Fig. 4*

RECORD OF RECEIPTS AND EXPENDITURES DURING FEBRUARY.

Witness:

Inventor:
George H. Deaton
By Cromwell, Treist & Warden
Attys.

Aug. 3, 1926.
G. H. DEATON
1,594,499
RECORD CALENDAR
Filed Oct. 2, 1922    3 Sheets-Sheet 3
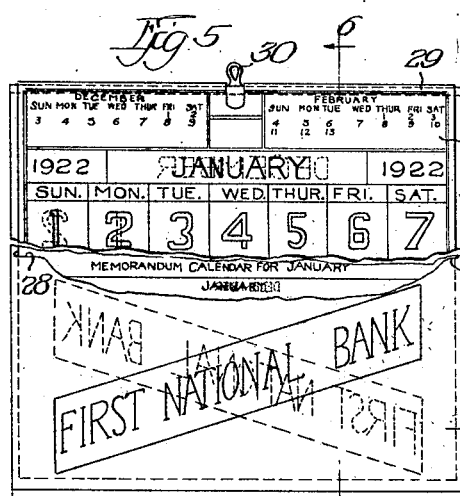
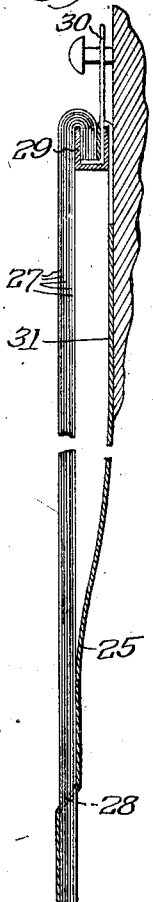
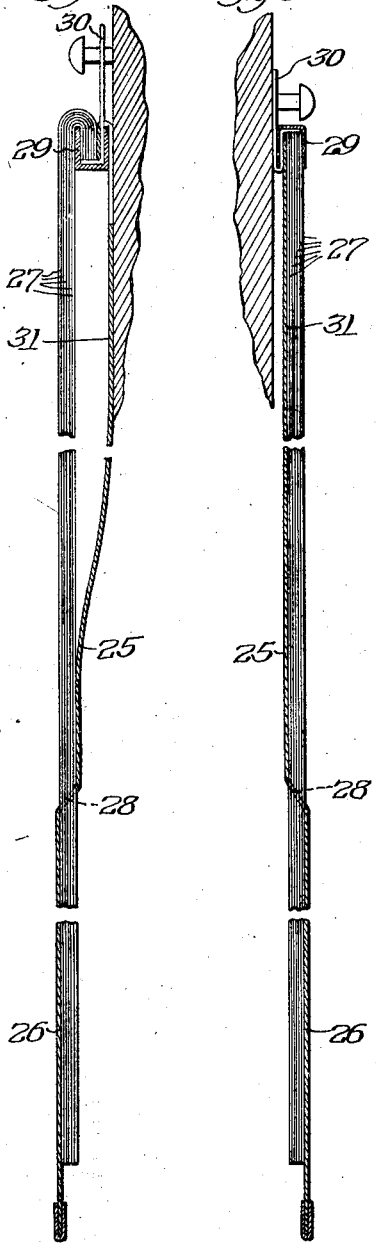
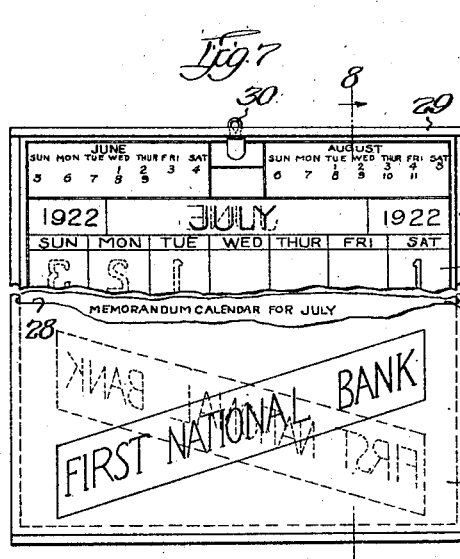
Inventor:
George H. Deaton Patented Aug. 3, 1926.

1,594,499

UNITED STATES PATENT OFFICE.

GEORGE H. DEATON, OF MAYWOOD, ILLINOIS.

RECORD CALENDAR.

Application filed October 2, 1922. Serial No. 591,711.

The present invention relates to that class of calendar structures wherein is incorporated means for receiving and for preserving in a private but readily available record form various memorandum entries.

The principal object of the invention resides in the provision of a record calendar embodying an improved constructional arrangement which is novelly characterized by a pad of combined calendar and record sheets mounted upon a base member and passing through a slot therein whereby to provide an exposed calendar portion and a covered conveniently accessible record portion.

The record calendar of this invention is possessed of numerous advantageous features, foremost among which is its simplicity and inexpensiveness of construction, its adaptability for reversal for use upon both sides, and its arrangement of the sheets for protection against any blowing or soiling of the same.

While the foregoing statements are indicative, in a general way, of the nature of the invention, other objects and advantages not herein specifically referred to will be appreciated upon a full comprehension of the novel features presented in the construction, arrangement, and manner of employment of the present record calendar.

In order that the invention may be readily understood, two slightly differing embodiments of the same are set forth in the accompanying drawings and in the following detailed description based thereon. Obviously the invention is susceptible of embodiment in other and varied constructional forms without departure from the essence of the invention or the sacrifice of its material advantages; wherefore it is to be understood that the drawings and description are to be considered in an illustrative and not in any unnecessarily limiting sense.

In the drawings,

Fig. 1 is a front view of a record calendar embodying the features of this invention;

Fig. 2 is a vertical section on the line 2—2 of Fig. 1;

Figs. 3 and 4 are front and rear views respectively, of the lower portion of one of the combined calendar and record sheets;

Fig. 5 is a front view of a reversible record calendar embodying the features of this invention, showing in a fragmentary way the upper and lower portions and omitting the intermediate portion;

Fig. 6 is a vertical section on the line 6—6 of Fig. 5;

Fig. 7 is a view similar to Fig. 5, showing the same calendar upon being reversed; and Fig. 8 is a vertical section on the line 8—8 of Fig. 7.

Referring with more particularity to Figs. 1, 2, 3 and 4 of the drawings, it will be observed that the record calendar of this invention comprises a base member 10 and an associated pad of combined calendar and record sheets 11. The base member 10 is provided, intermediate its upper and lower edges, with a horizontally elongated slot 12 which divides the member into an upper backing portion 13 and a lower cover portion 14. The sheets 11 are connected along their upper edges 15 to the upper edge of the member 10, and are each imprinted on their upper portions—with a large calendar 16 of a particular month and two smaller calendars 17 and 18 of the preceding and succeeding months, and—on their lower portions—with a chronological series of blanks 19 for memorandum entries. In addition, the rear sides of the sheets are each imprinted—on their lower portions—with an inverted blank 20 for the recording of such data as current receipts and expenditures for subsequent use in the calculation of income tax returns. The base member 10 is preferably provided, along its upper and lower edges, with metallic U-shaped binding strips 21; the upper strips serving to secure the sheets 11 to the member 10 and the lower strip serving to weight the cover portion 14 of the member. A hanger clip 22 is secured to the upper strip 21 at the central point thereof, and forms the support of the record calendar. Those portions of the base member 10 and sheets 11 immediately below the clip 22 are cut away as indicated at 23 to permit any or all of the sheets 11 to be raised and turned back over the strip 21 along the top of the base member without covering the clip 22. The aperture at 23 may also be used in place of the clip for forming the support of the record calendar.

The sheets 11 pass downwardly through the slot 12 in the base member 10 from in front of the backing portion 13 to a position behind the cover portion 14, whereby calendars 16, 17 and 18 are exposed to view and the record portions 19 and 20 are normally hidden. The lower cover portion 14 of the base member 10 is adapted either to lie normally in substantially the same plane as the upper portion 13 or in a plane closely parallel thereto, and may be swung outwardly and upwardly about the slot 12 as an axis into an elevated position in which the cover 14 is turned back against the face of the upper portion of the record calendar to give access to the memorandum blanks 19 for the purpose of either making entries or of referring to entries previously made. If access to the blank 20 is desired it is only necessary to turn the sheet containing the normally inverted blank 20 upwardly and back against the raised cover portion 14, whereupon the blank will be presented right side up and ready for use. In order to permit this pivotal movement of the cover portion 14 of the base member 10, the base member may either be made of flexible material or of stiff material provided with a hinge joint along the major axis of the slot 12. Where flexible material is employed, the base member is preferably reinforced adjacent the slot with a strip 24 of fabric or other tough flexible material.

It will be appreciated from the general arrangement of the pad of combined calendar record sheets with the base member as hereinbefore described, that a record calendar is presented which is characterized by an upper portion which exposes a large calendar 16 of the current month, a small calendar 17 of the preceding month, and another small calendar 17 of the succeeding month, and by a lower portion covered by a placard on which may be imprinted a picture or advertisement as desired, the placard upon being raised exposing private record forms for the entry of various kinds of data. It will of course be understood that when the current month shown on the upper portion of the record calendar has expired, the lower record portion of the sheet containing that month is withdrawn upwardly through the slot 12, the record calendar removed momentarily from its support on the wall or other mounting, and the sheet turned back over the top of the structure. The record portion of that sheet will take its place behind the record portions of the other sheets and will consequently be available at any time for reference by merely raising the cover portion 14 and the record portions of the sheets 11 in front of the particular record portion desired.

It will furthermore be appreciated that the sheets 11 are always held by the cover portion 14 in a compact pad and can neither blow nor become soiled. The strip 21 along the lower edge of the cover portion is not essential as a weight, but its use is advisable where the base member is formed of a light flexible material.

In the embodiment of the invention illustrated in Figs. 1, 2, 3 and 4 and hereinabove described, the use of twelve sheets—one for each month—is contemplated, but in Figs. 5, 6, 7 and 8 is disclosed a slightly modified embodiment of the invention wherein is presented a condensed reversible record calendar employing only six sheets and dispensing with the extra record blanks on the rear sides of the sheets.

Referring now with more particularity to Figs. 5, 6, 7 and 8 of the drawings, it will be observed that the arrangement of the pad of combined calendar and record sheets with the base member is substantially identical with the arrangement shown in Figs. 1, 2, 3 and 4 of the drawings; wherefore Figs. 5 and 7 purposely illustrate the record calendar in rather fragmentary form. The base member 25 differs from the base member 10 of the first embodiment in that the lower cover portion 26 is provided on both sides with the same picture or advertising inscription, as shown in dotted lines in Figs. 5 and 7, and the sheets 27 differ from the sheets 11 of the first embodiment in that six sheets instead of twelve are employed and both sides of each sheet are provided with an upper calendar portion and a lower record portion.

The twelve large calendars are arranged on both sides of the six sheets with "July" on the front face of the front sheet and "June" on the rear face thereof, "August" and "May" on the second sheet in the same relation, "September" and "April" on the third sheet, "October" and "March" on the fourth sheet, "November" and "February" on the 5th sheet, and "December" and "January" on the sixth sheet, with the "January" calendar facing the backing portion 31 of the base member. The purpose of this rather peculiar arrangement will be apparent upon an understanding of the manner in which the calendar is changed in exposing the large calendar of a current month in place of that of a month just expired.

Assuming that before use the record calendar is found with its sheets 27 lying in their normal positions flat against the base member 25 and free of the slot 28, which is the position that the sheets would naturally assume when bound to the base member by the strip 29, it will be found that the clip 30, being still in its original unbent form will extend in the same direction from the strip as the sheets and the base member. In order to expose the large "January" calendar and arrange the same in proper relation to the other sheets and to the base member, it is only necessary to hold the calendar up side down and reversely turn all of the sheets down on one side of the narrow inverted strip and the base member down on the other side of the strip, whereupon the unbent clip will be found to project upwardly, and the "January" calendar, which formerly faced the base member, will be exposed outwardly. It is then only necessary to insert all of the sheets downwardly through the slot and the record calendar is ready for suspension as shown in Figs. 5 and 6.

As each month expires, the outermost sheet is withdrawn from the slot and turned back over the upper edge of the base member. When the months up to and including "July" have expired and all of the six sheets accordingly have been turned back over the upper edge of the base member, the calendar is removed momentarily from its means of suspension and turned around, its clip reversely bent and its inverted strip returned to its original normal position, the sheets and backing member returned to their original normal positions, as shown in Figs. 7 and 8, and all of the sheets inserted through the slot in the base member from what is now the front side of the same, whereupon the large "July" calendar is exposed. The calendars of the following months are of course exposed as required by merely turning the uppermost sheet back over the upper edge of the base member. In this way a most efficient and desirable full sized record calendar for a year's period, together with a convenient record portion, is provided with a six sheet arrangement.

I claim:

1. A record calendar comprising a base member constituting an upper backing portion and a lower cover portion and provided intermediate said portions with a horizontally elongated slot, and a plurality of combined calendar and entry sheets secured to the backing portion of the base member and adapted to pass through the slot therein whereby the calendar portion of the outermost sheet may be exposed and the entry portion thereof covered, said cover portion of the base member being weighted adjacent its lower edge.

2. A record calendar comprising a base member constituting an upper backing portion and a lower cover portion and provided intermediate said portions with a horizontally elongated slot, a plurality of combined calendar and entry sheets secured to the backing portion of the base member and adapted to pass through the slot therein whereby the calendar portion of the outermost sheet may be exposed and the entry portion thereof covered, and a hanger clip positioned adjacent the upper edge of the base member for suspending the record calendar structure, the sheets being secured together adjacent their upper edges and provided with registering apertures in the vicinity of the clip whereby when the second sheet is due for use the outermost sheet previously in use may be withdrawn from its association with the slot in the base member, turned back over the top of the record calendar structure and preserved there as an accessible record without interfering with the use of any of the other sheets.

3. A record calendar comprising a base member constituting a backing portion and a cover portion and provided intermediate said portions with a transversely elongated slot, and a plurality of sheets having upper calendar portions and lower entry portions secured at their tops to the backing portion of the base member and adapted to pass through the slot therein with the calendar portions directly in front of the backing portion and the entry portions directly behind the the cover portion.

4. A record calendar comprising a base member, a plurality of calendar sheets, a hanger clip, and a binding strip having a channel within which marginal end portions of the base member, calendar sheets and hanger clip are rigidly held in contiguous relation, the portions of the base member and calendar sheets that are in proximity to the hanger clip being cut away whereby the binding strip may be inverted to project the hanger clip upwardly and the base member and the calendar sheets may be reversely bent downwardly on opposite sides of the inverted strip without effecting a change in the relative locations of the lower portions of the base member and the calendar sheets.

5. A record calendar comprising a base member constituting a backing portion and a flexibly connected cover portion and provided intermediate said portions with a transversely elongated slot, and a plurality of sheets having upper calendar portions and lower entry portions secured at their tops to the backing portion of the base-member and adapted to pass through the slot therein with the calendar portions directly in front of the backing portion and the entry portions directly behind the cover portion.

6. A calendar comprising a base member constituting an upper backing portion and a flexibly connected lower cover portion and provided intermediate said portions with a horizontally elongated slot, and a plurality of calendar sheets secured at their tops to the backing portion of the base member and adapted to pass through the slot therein with their upper portions directly in front of the backing portion whereby the calendar portion of the outermost sheet may be exposed and another portion thereof covered, the sheets being secured together adjacent their edges whereby when the second sheet is due for use the outermost sheet previously in use may be withdrawn from its association with the slot in the base member, turned back over the top of the record calendar structure and preserved there without interfering with the use of any of the other sheets.

In testimony whereof I have hereunto subscribed my name.

GEORGE H. DEATON.